United States Patent [19]
Meyer

[11] Patent Number: 5,184,685
[45] Date of Patent: Feb. 9, 1993

[54] SELF-CONTAINED NURSERY CULTIVATOR

[76] Inventor: Thomas A. Meyer, 1609 Hobe Rd., Woodstock, Ill. 60098

[21] Appl. No.: 727,902

[22] Filed: Jul. 10, 1991

[51] Int. Cl.$^5$ .................. A01B 33/02; A01C 23/00
[52] U.S. Cl. ........................... 172/114; 47/1.7; 239/288; 172/38; 111/133
[58] Field of Search .............. 172/114, 98, 99, 38, 172/233, 234, 292; 47/1.7; 111/130, 133; 180/215, 89, 12; 239/288; 56/14.7

[56] References Cited

U.S. PATENT DOCUMENTS

| | | | |
|---|---|---|---|
| 3,012,371 | 12/1961 | Pawela | 47/1.7 |
| 3,140,574 | 7/1964 | Brown, Jr. | |
| 3,147,568 | 9/1964 | Inhofer | 47/1.7 |
| 3,412,938 | 11/1968 | Larson | |
| 3,563,012 | 3/1971 | Strasel | 180/215 |
| 3,879,888 | 4/1975 | Riley | 47/1.7 |
| 4,126,198 | 11/1978 | Martin | 180/213 |
| 4,274,505 | 6/1991 | Maust | 180/215 |
| 4,485,588 | 12/1984 | Reed | |
| 4,524,912 | 6/1985 | Jones | |
| 4,531,589 | 7/1985 | Williams | 172/5 |
| 4,567,689 | 2/1986 | Lemons | 47/1.7 |
| 4,586,287 | 5/1986 | Bleasdale et al. | |
| 4,592,164 | 6/1986 | Ballu | 47/1.7 |
| 4,813,175 | 3/1989 | Meyer | |
| 5,042,236 | 8/1991 | Lamusga et al. | 56/2 |
| 5,086,582 | 2/1992 | Hamilton | 47/1.7 |

FOREIGN PATENT DOCUMENTS 1289405  2/1987  U.S.S.R. .................. 47/1.7

Primary Examiner—Randolph A. Reese
Assistant Examiner—Spencer Warnick
Attorney, Agent, or Firm—Matthew R. P. Perrone

[57] ABSTRACT

A nursery cultivating assembly is carried on a modified zero turning radius tractor and includes a cultivating device, a spraying device, and a tank assembly operably interconnected thereon, while providing for trees to be planted closer together.

10 Claims, 5 Drawing Sheets

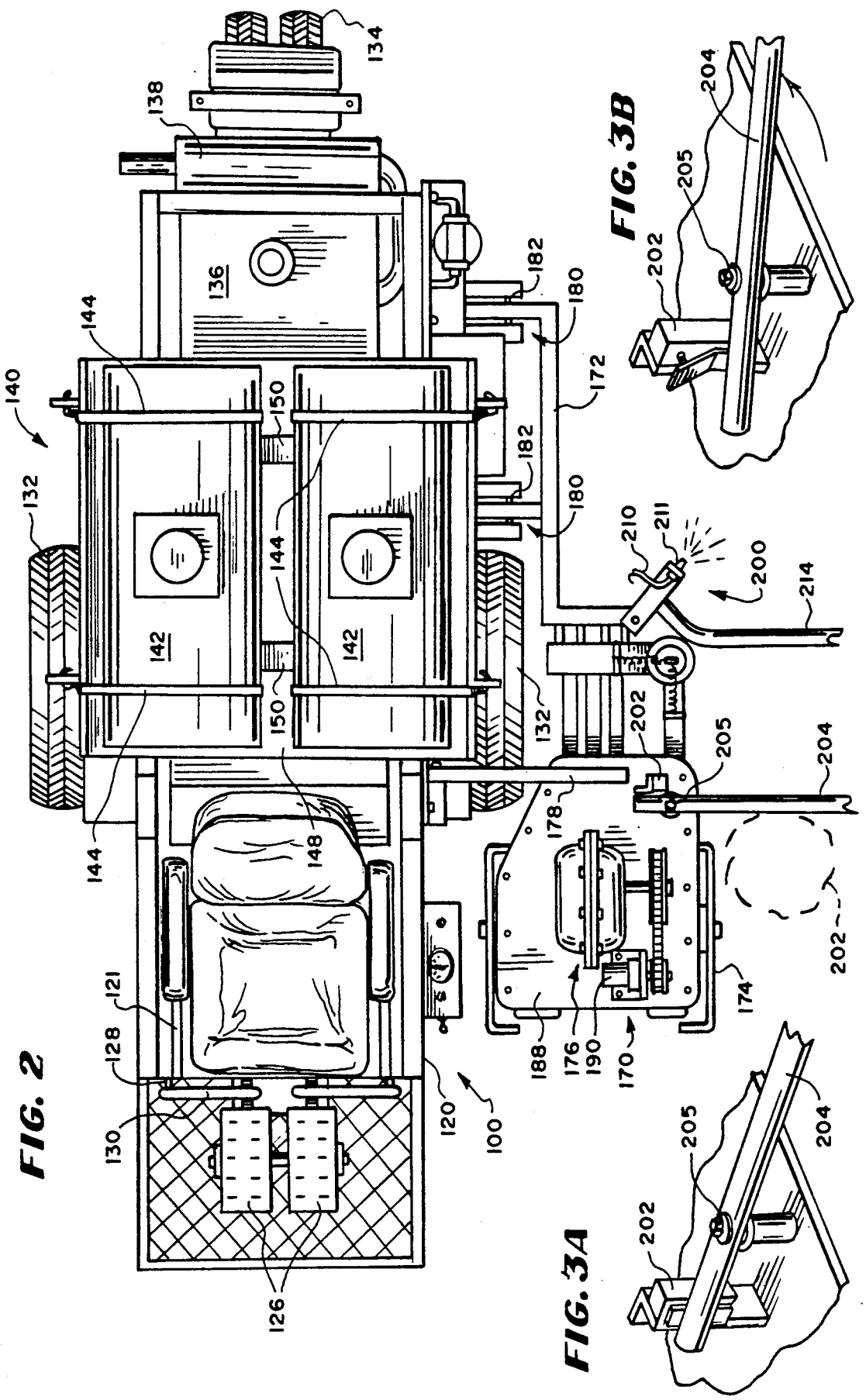

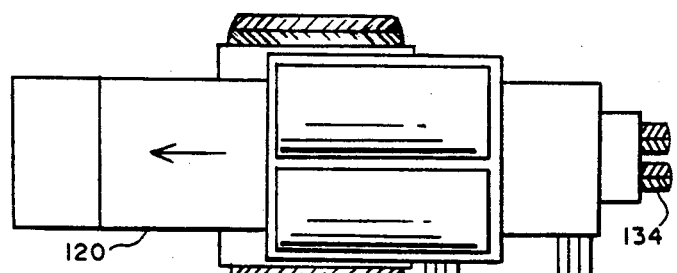
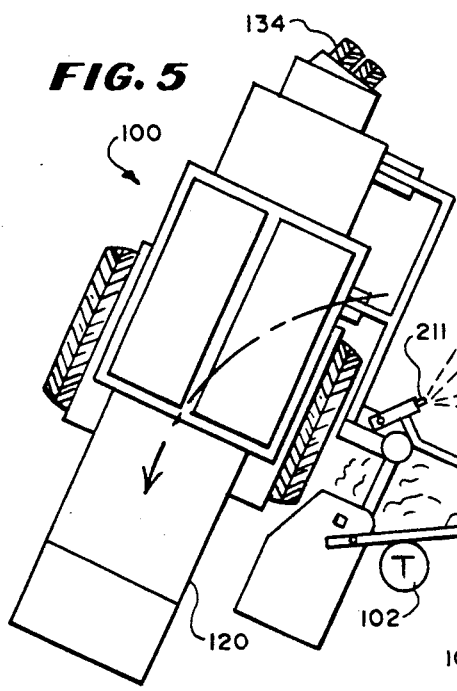
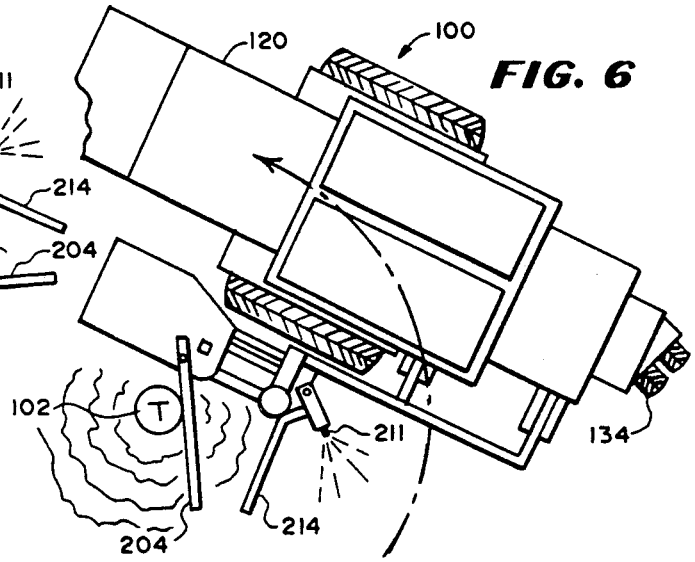
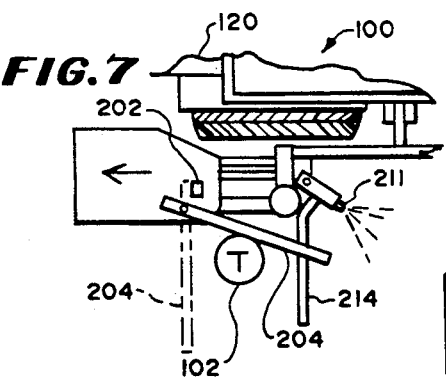
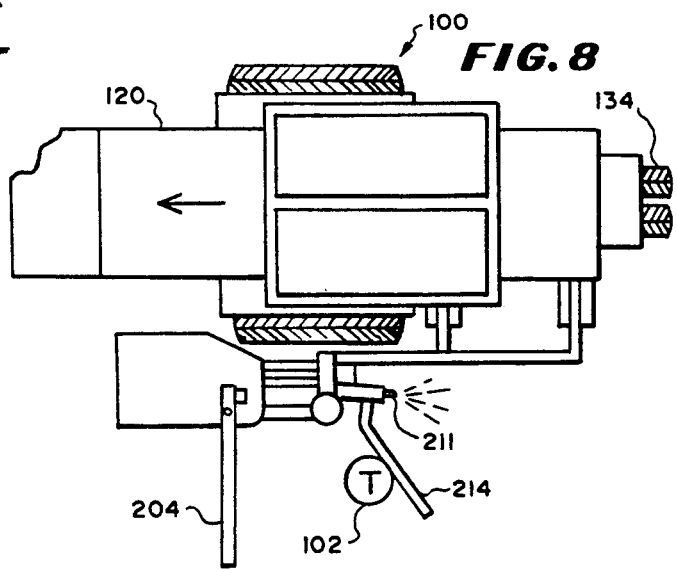

SELF-CONTAINED NURSERY CULTIVATOR

This invention relates to a cultivating assembly for use in a nursery and more particularly to a cultivating assembly for use in a nursery capable of applying fertilizer, pesticide, herbicide, another nutrient, or combinations thereof during the cultivation process.

BACKGROUND OF THE INVENTION

In U.S. Pat. No. 4,813,175 by the same inventor, incorporated herein by reference, the problems of applying herbicide, fertilizer, pesticide or any combination thereof, while at the same time cultivating the ground, are discussed. Growth of plants for commercial sale and planting around business structures or residential structures is still an extremely important business. The advantages of plants and trees both from an aesthetic and ecological standpoint are thoroughly discussed in the referenced patent. Growing of the trees in a nursery is greatly assisted by the device described in the prior patent.

However, the device described in the prior patent can be improved. Basically, the device described in the prior patent is now known to be somewhat larger than a nursery can efficiently use, if the trees are planted closer together. A commercial nursery has a great desire to plant the trees closer together in order to provide for more efficient use of the soil for growing the trees, by growing more trees on less land.

While it is desired to apply fertilizer and other nutrients, along with a pesticide and a herbicide around a tree to assist to the growing thereof, it can be a problem if the spray contacts the bark. Such contact can destroy the advantage of the treatment. It is desired to avoid such bark spraying. Yet to avoid such spraying contact with the bark is difficult when using a tractor or similar device for the spraying.

The size of the prior art device requires a larger area around the trees to permit maneuvers therebetween. But to plant more trees in the same land area requires hand treatment and cultivation. It is desirable to decrease the area required between the trees and provide the same protection as provided by the device described in the prior patent, while at the same time achieving the same results. If this can be accomplished, the same efficiency can be achieved as with the device of the prior art, while at the same time providing for more efficient use of land due to permitting the growing of more trees on that same land area.

SUMMARY OF THE INVENTION

Therefore, it is an objective of this invention to provide an assembly for cultivating in a nursery.

A further objective of this invention is to provide an assembly for properly cultivating in a nursery while permitting trees to be planted closer together.

A still further objective of this invention is to provide an assembly for properly applying pesticide in a nursery while permitting trees to be planted closer together.

Yet a further objective of this invention is to provide an assembly for properly applying herbicide in a nursery while permitting trees to be planted closer together.

Also an objective of this invention is to provide an assembly for properly applying fertilizer in a nursery while permitting trees to be planted closer together.

Another objective of this invention is to provide an assembly which avoids undesired spraying onto the bark of a tree.

Yet another objective of this invention is to provide a method for avoiding undesired spraying onto the bark of a tree.

Still another objective of this invention to provide a method for cultivating in a nursery.

A further objective of this invention is to provide a method for properly cultivating in a nursery while permitting trees to be planted closer together.

A still further objective of this invention is to provide a method for properly applying pesticide in a nursery while permitting trees to be planted closer together.

Yet a further objective of this invention is to provide a method for properly applying herbicide in a nursery while permitting trees to be planted closer together.

Also an objective of this invention is to provide a method for properly applying fertilizer in a nursery while permitting trees to be planted closer together.

These and other objectives of the invention (which other objectives become clear by consideration of the specification, claims and drawings as a whole) are met by providing a nursery cultivating assembly carried on a modified zero turning radius tractor and including a cultivating device, a spraying device, and a tank assembly operably interconnected thereon.

BRIEF DESCRIPTION OF THE DRAWINGS

FIG. 2 depicts a top plan view of cultivating assembly 100 of this invention.

FIG. 3A depicts a closed or off position for spray switch 202 of cultivating assembly 100 of this invention.

FIG. 3B depicts an open or on position for spray switch 202 of cultivating assembly 100 of this invention.

FIG. 4 depicts a top plan view of cultivating assembly 100 of this invention showing initial contact with a tree 102.

FIG. 5 depicts a second position of cultivating assembly 100 after contact with tree 102.

FIG. 6 depicts a continuing contact position with tree 102 as the cultivating assembly 100 completes a circle around the tree 102.

FIG. 7 depicts a close up view of the switch arm 204 in contact with tree 102.

FIG. 8 depicts a nozzle pivot arm 214 spray lever in contact with tree 102.

Throughout the figures of the drawings where the same part appears in more than one figure, the same number is applied thereto.

DESCRIPTION OF THE PREFERRED EMBODIMENTS

The nursery cultivating assembly of this invention includes a zero turning radius tractor with a cultivating device operably attached thereto. The zero turning radius tractor has been modified to put the seat assembly more forward of the front wheels. The controls for handling the tractor have also been appropriately modified.

With this forward seat assembly, it becomes possible to mount a tank assembly between and above the tires of the tractor. With the seat assembly forward the tank assembly balances the tractor and produces a more even distribution of the weight. Along the side of the tractor, the cultivating device and a spraying device are attached. The cultivating device and spraying device are substantially similar to the cultivating device and the spraying assembly disclosed and discussed in U.S. Pat. No. 4,813,175 to the same inventor, incorporated herein by reference.

However, the spraying assembly as disclosed herein additionally includes a spray directing rod which extends laterally and outwardly behind the spray switch. This spray directing rod can cause the nozzle, and thence the spray, to be deflected away from the bark of the tree. The type of spray that is being applied around the base of the tree in the cultivated area can conceivably damage the bark of the tree if heavy concentrations of the spray were applied thereto. Accordingly, this spray directing rod causes the deflection of the spray nozzle when the spray switch or activating lever contacts or loses contact with the tree.

The cultivating assembly is suitable for cultivating the land around trees. The advantage of such an assembly is thoroughly explained in U.S. Pat. No. 4,813,175 to the same inventor. Through this process, the trees grow more quickly and more efficiently, while at the same time grass is left in place to provide conservation of the soil.

Figure 1:
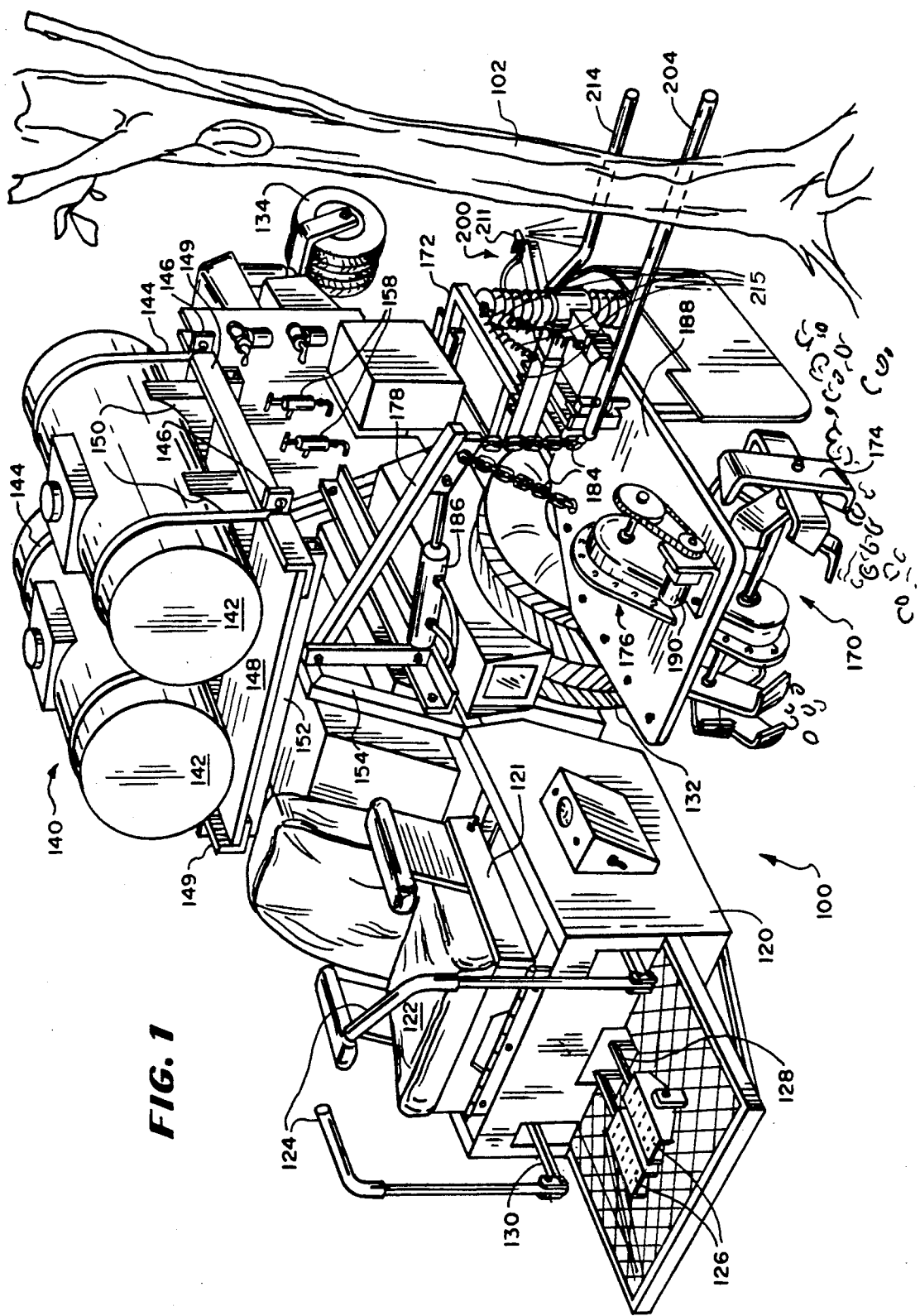
FIG. 1 is a front quarter perspective of cultivating assembly 100 of this invention treating a tree 102.

Referring now to FIG. 1, the nursery cultivating assembly 100 is shown in contact with a tree 102. To form the nursery cultivating device 100, tractor 120 has tank assembly 140, a cultivating device 170 and a spraying device 200 mounted thereon. The tractor 120, the tank assembly 140, the cultivating device 170 and the spraying device 200 are operably interconnected to provide necessary treatment to trees planted closer together in a nursery than usual, the trees now being plantable at about a two meter radius in the nursery.

The tractor 120 is preferably a modified zero turning radius tractor 120 having a seat 122 mounted on a modified seat frame 121 which mounts the seat 122 forwardly on the tractor 120. Hand controls 124 and foot controls 126 are respectively extended by foot extenders 128 and hand extenders 130 to provide for operation of the tractor 120 from this forward position.

Figure 9:
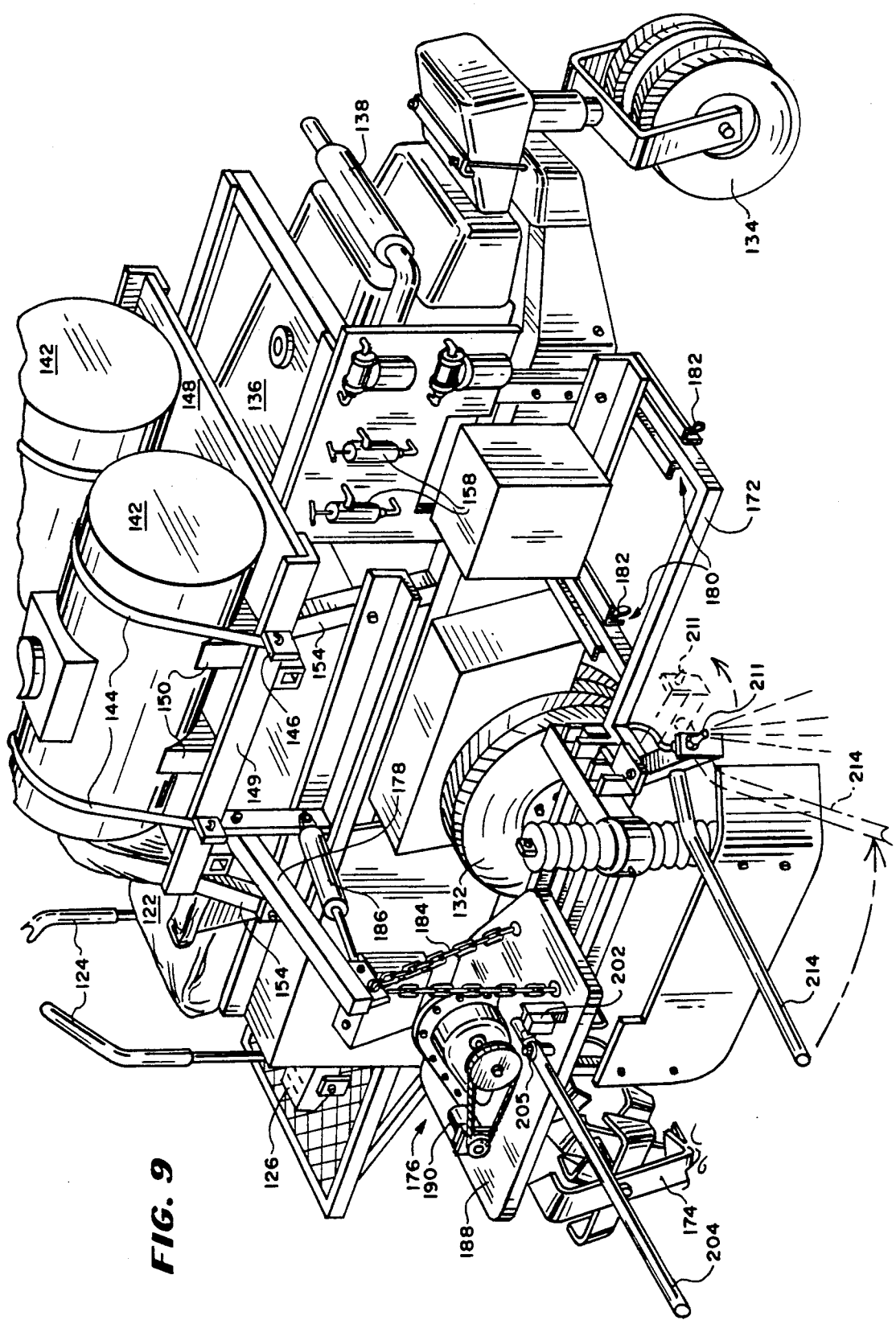
FIG. 9 depicts a rear quarter perspective view of cultivating assembly 100 of this invention.

Referring now to FIG. 1, FIG. 2, and FIG. 9, the tank assembly 140 and the cultivating device 170 are substantially supported between turning wheels 134 and seat wheels 132. Seat wheels 132 are adjacent to seat 122 and turning wheels 134 are located along a rearward portion of the tractor 120 oppositely disposed from the seat 122. Gas tank 136 for the tractor 120 is adjacent turning wheels 134. The muffler and exhaust 138 for the tractor 120 is positioned adjacent turning wheels 134 to prevent the exhaust and heat therefrom from interfering with operation of the tractor 120 from seat 122.

The tank assembly 140 includes an elevated tank platform 148 with tank straps 144 holding two tanks 142 thereon. Each tank strap 144 engages frame flanges 146 secured to the tank platform 148. A tank frame 149 supports and engages tank platform 148 to frame elements (not shown) of tractor 120. Tank yokes 150 securely position the cylindrical tanks 142 on tank platform 148.

A horizontal tractor brace 152 is bolted to the frame of tractor 120 and tank frame 149 and provides further support and attachment for the tank frame 149 to the frame of the tractor 120. A pair of vertical tractor braces 154 are included in tank frame 149. As shown in FIG. 9, a short vertical tractor brace 154 is adjacent seat 122 while a longer rear tractor brace 154 is adjacent the seat wheels 132. A valve 158 for operating the tanks 142 is positioned below the tanks 142 and creates the desired result of spraying at the correct time.

Figure 10:
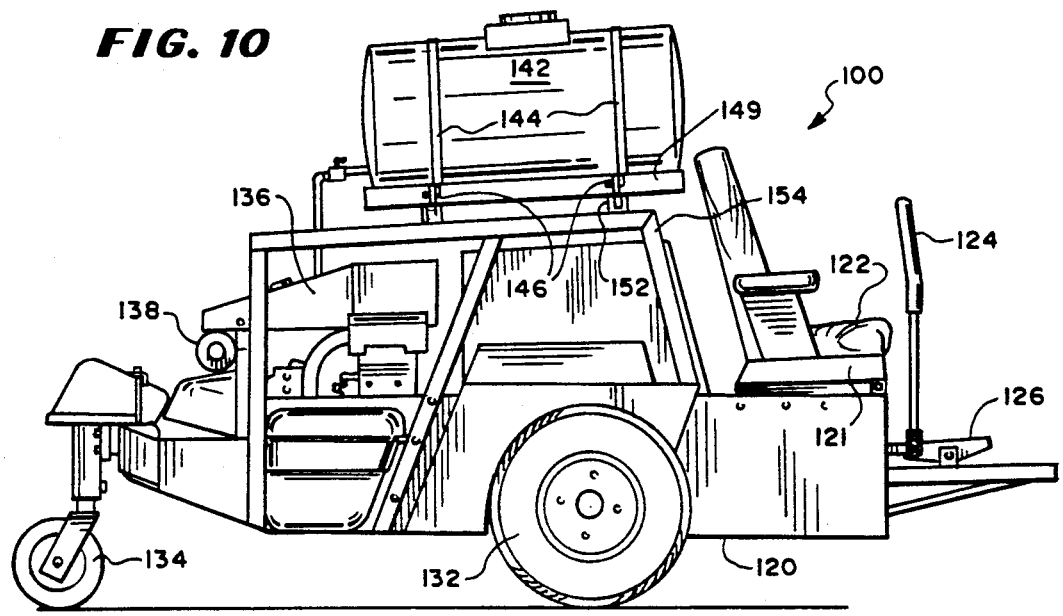
FIG. 10 depicts a side view of cultivating assembly 100 of this invention.
Figure 11:
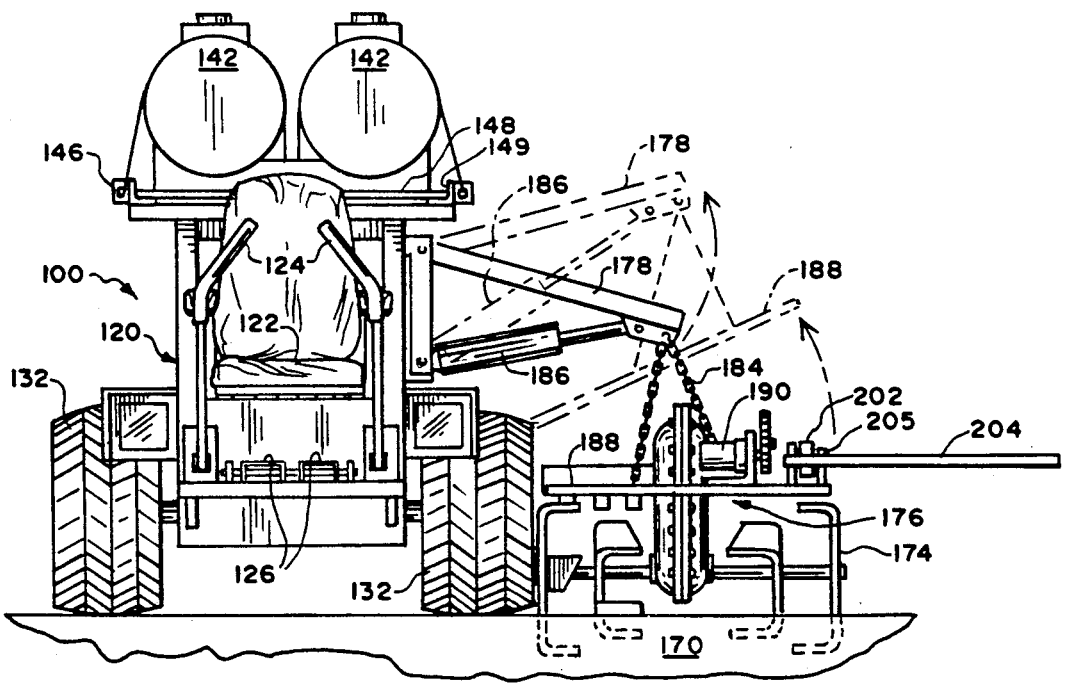
FIG. 11 depicts a front perspective view of the cultivating assembly 100 of this invention.

By considering FIG. 1, FIG. 10, and FIG. 11, the cultivating device 170 is seen to include a cultivator frame 172 hingedly attached to the tractor 120. At the lower part of the frame 172 is a cultivating rotary tiller in the form of a rototiller 174. Above the rototiller 174 is a drive assembly 176 therefor.

Lifting levers 178 engage to and provide for lifting of the rototiller 174 when tilling is not desired. Cultivator hinges 180 permit the lifting levers 178 to lower rototiller 174 for a tilling operation and to lift rototiller 174 when tilling is not desired. Hinge pins 182 in cultivator hinges 180 support this lifting. A lift chain 184 is connected to lever 178, with lever 178 in turn being hydraulically controlled by a ram cylinder 186 to move the chain 184 as desired. The operating mechanism of the ram cylinder 186 is of standard fashion. A tine deck 188 supports a tine motor 190 and drives the rototiller 174.

Referring now to FIG. 4, FIG. 5, FIG. 6, FIG. 7, and FIG. 8, a complete cycle of operation of the assembly 100 around a tree 102 can be understood. Fertilizer, herbicide, pesticide, another nutrient, or combinations thereof can be applied to a tree 102 or series of trees 102. A spray activator arm 204 engages against a tree 102 and pivots rearwardly about a pivot 205 positioned forwardly and adjacent to spray switch 202. As shown in FIG. 3B, as arm 204 pivots rearwardly, switch 202 opens, allowing material in the tanks 142 to travel down spraying hose 210 and exit a nozzle 211 pointing rearwardly and laterally.

Upon continued contact of the tree 102 with the arm 204, switch 202 is maintained open and nozzle 211 continues spraying the materials from the tanks 142.

It must be understood that at a particular point within travel of the assembly 100, the tree 102 must still be in contact with sprayer arm 204 while entering the radius of the spray being ejected from the nozzle 211.

To prevent the tree 102 from coming into contact with the spray, the nozzle 211 is pivotably mounted and has engaged thereto a deflecting arm 214 which extends laterally and outwardly at a predetermined position behind the sprayer arm 204. In this respect, as the tree 102 begins to enter the area where it can be sprayed because it has not lost contact with spray arm 204, the tree 102 engages deflecting arm 214, which, when rearwardly deflected, causes a lateral inward deflection of the spray nozzle 211, which is necessary to keep the tree 102 from being sprayed until contact with spray arm 204 is lost.

It must also be understood that spray arm 204 is biased by a spring (not shown) to return to a forward position thereof upon loss of contact with tree 102. Upon forward swing of arm 204, spray switch 202 is closed thereby, as shown in FIG. 3A, stopping spray from exiting the nozzle 211.

It must further be clear from the drawing and the disclosure that once the tree 102 is no longer in contact with deflecting arm 214, the deflecting arm 214 too returns to its forward most position, under action of a biasing spring 215 (shown in FIG. 1), returning the nozzle 211 to its desired position.

Further, it must be understood from FIG. 6 that while the tractor 120 circles the tree 102, its only point of contact with the tree 102 is through spray arm 204. Only upon linear forward motion of the tractor 120 as it leaves the particular tree 102 it is spraying, does deflector arm 214 become engaged with tree 102 and enter into play by deflecting nozzle 211 and keeping a spray from contacting the bark of tree 102.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by Letters Patent of the United States is:

1. A self-contained cultivating assembly for use in a nursery, said cultivating assembly being capable of applying a fertilizer, a pesticide, a herbicide, a nutrient, or a combination thereof during a cultivation process, wherein:
   a. said cultivating assembly includes a zero turning radius tractor for carrying and transporting a cultivating device, a spraying assembly, and a tank assembly which are connected to permit working together thereof;
   b. said spraying assembly includes means for removing contents of said tank assembly and applying said contents to a desired area, a spray switch for operating said means for removing contents and a spray directing arm to aim said spraying assembly to said desired area;
   c. said zero turning radius tractor includes a seat assembly;
   d. said seat assembly provides a means for mounting a seat for an operator of said tractor forward on said tractor to permit said cultivator assembly to be balanced on said tractor;
   e. a tank mounting means provides a connecting means for said tank assembly to said zero turning radius tractor;
   f. said spray directing arm extends laterally and outwardly behind said spray switch from said zero turning radius tractor;
   g. said seat assembly includes a seat frame, a hand control and a foot control for controlling operation of said zero turning radius tractor;
   h. said zero turning radius tractor includes turning wheels at a rear end thereof and seat wheels at a front end thereof; and
   i. said seat assembly is adjacent to said seat wheels.

2. The self-contained cultivating assembly of claim 1, wherein:
   a. said tank assembly is mounted on a top portion of said zero turning radius tractor between said turning wheels and said seat wheels;
   b. said tank assembly includes an elevated tank platform to receive at least one tank; and
   c. said means for removing contents of said tank assembly is connected to said at least one tank for fluid communication between said at least one tank and said spraying assembly.

3. The self-contained cultivating assembly of claim 2, wherein
   a. said tank assembly includes two pair of tank yokes mounted on said tank platform;
   b. said at least one tank includes two tanks, each of said two tanks being mounted in a pair of said tank yokes;
   c. a pair of tank straps holds each of said tanks in said tank yokes; and
   d. a tank frame supports and connects said tank platform to at least one frame element of said tractor.

4. The self-contained cultivating assembly of claim 3, wherein:
   a. said cultivating device includes a cultivating frame;
   b. said cultivating frame is hingedly attached to said tractor;
   c. a cultivating rotary tiller is secured to said cultivator frame; and
   d. at least one lifting lever is connected to and provides for lifting of said rotary tiller.

5. The self-contained cultivating assembly of claim 4, wherein:
   a. said at least one lifting lever includes a hydraulic lifting mechanism; and
   b. said cultivator supports a tine motor to drive said cultivating rotary tiller.

6. The self-contained cultivating assembly of claim 5, wherein:
   a. said spraying assembly includes a nozzle connected thereto;
   b. a spray activator arm engages said spray switch and is movable in a generally horizontal fashion; and
   c. said spray switch operates said means for removing contents to permit a liquid to flow from said nozzle of said spray assembly.

7. The self-contained cultivating assembly of claim 6, wherein:
   a. said spray activator arm firstly contacts a tree; and
   b. said spray directing arm secondly contacts said tree.

8. A self-contained cultivating assembly for use in a nursery, said cultivating assembly being capable of applying a fertilizer, a pesticide, a herbicide, a nutrient, or a combination thereof during a cultivation process, wherein:
   a. said cultivating assembly includes a zero turning radius tractor for carrying and transporting a cultivating device, a spraying assembly, and a tank assembly which are connected to permit working together thereof;
   b. said spraying assembly includes means for removing contents of said tank assembly and applying said contents to a desired area, a spray switch for operating said means for removing contents and a spray directing arm to aim said spraying assembly to said desired area;
   c. said zero turning radius tractor includes a seat assembly;
   d. said seat assembly provides a means for mounting a seat for an operator of said tractor forward on said tractor to permit said cultivator assembly to be balanced on said tractor;
   e. a tank mounting means provides a connecting means for said tank assembly to said zero turning radius tractor;

f. said spray directing arm extends laterally and outwardly behind said spray switch from said zero turning radius tractor;

g. said seat assembly includes a seat frame, a hand control and a foot control for controlling operation of said zero turning radius tractor;

h. said zero turning radius tractor includes turning wheels at a rear end thereof and seat wheels at a front end thereof;

i. said seat assembly is adjacent to said seat wheels;

j. said tank assembly is mounted on a top portion of said zero turning radius tractor between said turning wheels and said seat wheels;

k. said tank assembly includes an elevated tank platform to receive at least one tank; and l. said spraying assembly is connected to said at least one tank.

9. The self-contained cultivating assembly of claim 8, wherein:

a. said tank assembly includes two pair of tank yokes mounted on said tank platform;

b. said at least one tank includes two tanks, each of said two tanks being mounted in a pair of said tank yokes;

c. a pair of tank straps holds each of said tanks in said tank yokes;

d. a tank frame supports and connects said tank platform to at least one frame element of said tractor;

e. said cultivating device includes a cultivator frame to support said cultivating device on said zero turning radius tractor;

f. said cultivator frame is hingedly attached to said zero turning radius tractor;

g. a cultivating rotary tiller is secured to said cultivator frame;

h. at least one lifting lever is engaged to and provides for lifting of said cultivating rotary tiller;

i. said at least one lifting lever includes a hydraulic lifting mechanism; and j. said cultivator supports a tine motor to drive said cultivating rotary tiller.

10. The self-contained cultivating assembly of claim 9, wherein:

a. a spray activator arm engages said spray switch and is movable in a generally horizontal fashion; and b. said switch operates said means for removing contents of said tank assembly to permit a liquid to flow from a nozzle of said spray assembly;

c. said spray activator arm is pivotally mounted to a spring assembly for returning said spray activator arm to a first original position;

d. said spray directing arm is pivotally mounted to a spring assembly for returning said spray directing arm to a second original position;

e. said spray activator arm firstly contacts a tree as said zero turning radius tractor advances in an operating mode; and f. said spray directing arm secondly contacts said tree.

* * * * *